United States Patent [19]

Juneau

[11] Patent Number: 4,576,806

[45] Date of Patent: Mar. 18, 1986

[54] REMOVAL OF SALT FROM POLYPHOSPHAZENE

[75] Inventor: Matthew K. Juneau, Baton Rouge, La.

[73] Assignee: Ethyl Corporation, Richmond, Va.

[21] Appl. No.: 718,004

[22] Filed: Mar. 29, 1985

[51] Int. Cl.$^4$ ............................................. C01B 25/10
[52] U.S. Cl. ..................................................... 423/300
[58] Field of Search ........................................ 423/300

[56] References Cited

U.S. PATENT DOCUMENTS 4,157,425  6/1979  Dieck et al. .................... 423/300

*Primary Examiner*—John Doll
*Assistant Examiner*—Wayne A. Langel
*Attorney, Agent, or Firm*—Donald L. Johnson; John F. Sieberth; Joseph D. Odenweller

[57] ABSTRACT

Residual alkali metal salt (e.g. NaCl) is removed from an alkali metal alkoxide and/or aryloxide-polyphosphonitrilic halide reaction product by neutralizing the reaction solution with acid and water extracting the salt using a lower water-soluble alcohol (isopropanol) to effect rapid phase separation.

28 Claims, No Drawings

REMOVAL OF SALT FROM POLYPHOSPHAZENE

BACKGROUND OF THE INVENTION

Organo-substituted polyphosphazenes are usually made by reacting a solution of a polyphosphonitrilic chloride with a solution or slurry of an alkali metal (e.g. sodium) alkoxide, aryloxide or mixtures thereof including substituted alkoxides and aryloxides. This forms an alkali metal salt (e.g. NaCl) in extremely finely divided form. Attempts have been made without much success to remove this salt by filtration. Better results have been achieved by washing the reaction solution with water to dissolve the salt into the aqueous phase and then removing the aqueous phase. However, phase separation even after acid neutralization is a constant problem and in some cases the resulting emulsions will not separate at all. Accordingly, a need exists for a polyphosphonitrilic halide substitution process which permits removal of most of the by-product salt without formation of a stable emulsion.

SUMMARY OF THE INVENTION

The present invention provides a process for making a low-salt polyphosphazene said process comprising (A) reacting a solution of a polyphosphonitrilic halide with a substituting agent selected from alkali metal alkoxides, alkali metal aryloxides or both alkali metal alkoxides and aryloxides to form a solution of alkoxy-substituted, aryloxy-substituted or both alkoxy and aryloxy-substituted polyphosphazene containing alkali metal halide contaminant, (B) neutralizing residual alkali metal alkoxide and/or aryloxide, (C) adding water and a lower water-soluble alcohol to the substituted polyphosphazene solution to dissolve said alkali metal halide, (D) separating an aqueous phase containing said alkali metal halide and a non-aqueous organic phase containing said low-salt polyphosphazene, and (E) recovering said low-salt polyphosphazene from said organic phase.

Polyphosphonitrilic halides are polymers which contain a series of

groups wherein X represents a halogen such as chlorine or bromine and n is an integer from 3 to about 50,000 or more. Such polymers may be low molecular weight cyclics such as trimer, tetramer and the like or may be linear polymers. Low molecular weight linears are those in which n averages about 3-20 and most frequently about 4-10 and are generally referred to as oligomers. High molecular weight polymers generally contain about 20-50,000 or more units (n=20-50,000 or more).

Methods for making such polyphosphonitrilic halides are well-known. For example, the cyclics are readily made by adding PCl$_5$ to an excess of ammonium chloride in a solvent such as monochlorobenzene at temperatures of about 120°-130° C. The product is a mixture of trimer, tetramer and some higher cyclic products. Conducting the reaction using excess PCl$_5$ and reverse addition forms a product that is mainly oligomer wherein n is about 3-20. Cyclics can be separated from linears by precipitation from solvents such as monochlorobenzene, heptane and the like or by distillation or both.

Higher molecular weight linear polyphosphonitrilic halides are made by the thermal polymerization of purified cyclic trimer at 200°-300° C. under an inert atmosphere preferably using a catalyst such as aluminum chloride, boron trichloride and the like. The polymerization may be run in a solvent but use of a solvent is not required and in fact the polymerization is generally run without any solvent. The polymerization must be stopped prior to gel formation which is caused by cross-linking. Polymerization times of 12-48 hours will generally give a linear non-cross-linked polyphosphonitrilic chloride that is soluble in solvents such as benzene, toluene, cyclohexane, THF and the like. If the product is insoluble in such solvents, it is extensively cross-linked and of little or no use in forming organo-substituted polyphosphazenes because it must be in solution to react with the usual substitution agents (e.g. sodium phenoxide, sodium alkylphenoxide, etc.)

The present process can be used in the substitution of any of the foregoing non-cross-linked polyphosphonitrilic halides, especially those in which n has an average value of about 10-50,000. However the process is most useful in making organo-substituted polymers from substantially linear polyphosphonitrilic chloride in which n has an average value of at least 20 up to about 50,000.

The substitution reaction is conducted in a solvent which is substantially inert under reaction conditions and in which the polyphosphonitrilic halide has at least some solubility, for example at least about 5 weight percent. Suitable solvents are aromatic hydrocarbons (e.g. toluene, xylene and the like), cycloaliphatics (e.g. cyclohexane), ethers (e.g. tetrahydrofuran, dioxane, dimethoxyethane, dimethyl ether of diethylene glycol, diethyl ether of diethylene glycol, dimethyl ether of triethylene glycol, di-n-butyl ether and the like), halogenated hydrocarbons and the like. The more useful polyphosphonitrilic halide solvents are aromatic hydrocarbons, cycloaliphatic hydrocarbons and ethers. The most useful solvents are toluene and cyclohexane or mixtures thereof. The amount of polyphosphonitrilic halides that will dissolve in such solvents is limited, especially with the very high molecular weight polymers. Good results are achieved with solutions containing about 5-20 weight percent polyphosphonitrilic halide.

The polyphosphonitrilic halide solution is next reacted with one or more solutions or slurries of alkali metal alkoxides, aryloxides or mixtures of alkali metal alkoxides and aryloxides including substituted alkoxides and aryloxides. Alkali metal alkoxides can contain about 1-20 carbon atoms and include alkoxides such as sodium methoxide, potassium methoxide, sodium ethoxide, sodium isopropoxide, potassium n-propoxide, potassium isobutoxide, sodium n-butoxide, sodium n-pentoxide, sodium 2-ethyl hexoxide, potassium n-dodecoxide, sodium n-tetradecoxide, potassium eicosoxide and the like. The alkoxides can be substituted with groups such as halogen (e.g. fluorine, chlorine, bromine or iodine), alkoxy (e.g. methoxy, ethoxy, n-butoxy, etc.), nitro, acyl, aryloxy, aryl, alkylaryl and the like. Representative examples of such substituted alkoxide groups are trifluoroethoxide, difluoroethoxide, dichloroethoxide, tribromoethoxide, 2,2,3,3-tetrafluorpropoxide, 2,2,3,3,4,4,4-heptafluoride butoxide, 2-methoxy ethoxide, 2-ethoxy ethoxide, benzyloxide, 2-phenylethoxide, 2-acetylethoxide, 2-benzoylethoxide, 2-nitroethoxide and the like.

A highly preferred class of substituted alkoxides are the polyfluoroalkoxides having the structure

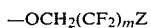

—OCH$_2$(CF$_2$)$_m$Z wherein m is an integer from 1 to about 10 and Z is hydrogen or fluorine and including mixtures thereof.

The alkoxide substituent can contain olefinic unsaturation in which case it becomes an alkenoxide group such as allyloxide, 2-butenyloxide, 3-hexenyloxide, 4-octenyloxide and the like. Such groups can act as crosslinking sites during vulcanization.

Alkali metal aryloxides contain 6 to about 20 carbon atoms and include substituted aryloxides. The aryl portion can be a benzene ring or it can be a polynuclear aryl group such as naphthalene, anthracene, phenanthrene and the like. Substituents include groups such as alkyl (e.g. methyl, ethyl, n-butyl, n-octyl, isodecyl, 2-ethyl dodecyl and the like), halogen (e.g. chlorine, bromine, fluorine and iodine), nitro, trihalomethyl, alkoxy (e.g. methoxy, ethoxy, n-butoxy, n-hexoxy and the like), acyl, acyloxy, benzoyl, alkenyl and the like.

Representative examples of such aryloxides are phenoxide, p-ethylphenoxide, 4-chlorophenoxide, 2,4-dibromophenoxide, o-methylphenoxide, 4-trifluoromethylphenoxide, 4-dodecylphenoxide, 4-nitrophenoxide, 4-methoxyphenoxide, 4-n-butoxyphenoxide, 4-acetylphenoxide, 4-acetoxyphenoxide, 4-benzoylphenoxide, o-allylphenoxide, p-allylphenoxide and the like. An olefinically substituted aryloxide imparts curing properties during later vulcanization.

Mixtures of alkoxides and aryloxides can be used to substitute polyphosphonitrilic halides. For example, mixtures of alkali metal alkoxides, phenoxides and alkylphenoxides can be used to give substituted polymers useful for wire and cable insulation. Alternatively the substitution can be conducted sequentially with alkali metal alkoxide, alkali metal alkylphenoxide and alkali metal phenoxide in any sequence such that the total substitution groups is about equal to the total equivalence of replaceable halide.

The process is especially useful in preparing polyphosphazenes in which the substituents are phenoxide, alkylphenoxide and optionally o-allylphenoxide. For example, useful polymers are obtained by substituting a high molecular weight polyphosphonitrilic chloride with about 20–80 mole percent phenoxide groups, 20–80 mole percent p-ethylphenoxide groups and 0–20 mole percent o-allylphenoxide groups, more preferably about 1–15 mole percent o-allylphenoxide group. These substituents can be introduced all at once or in any sequence by preparing the alkali metal, preferably sodium, aryloxides by the reaction of sodium metal with an ether (e.g. tetrahydrofuran), aromatic hydrocarbon (e.g. toluene) or cycloaliphatic hydrocarbon (e.g. cyclohexane) solution of phenol, p-ethylphenol and optionally o-allylphenol. The total moles of alkali metal substituent compounds should be about 1.03–1.05 times the equivalents of replaceable chlorine in the phosphonitrilic chloride polymer.

The alkali metal used to make the alkoxide and/or aryloxide can be any alkali metal such as sodium or potassium but is preferably sodium due to its low cost and ready availability. The aryloxides are generally formed by adding phenols to molten sodium. Optionally sodium dispersion can be added to either alcohol or phenols to form alkoxides or aryloxides. Care should be taken to avoid explosions since hydrogen is evolved. In the case of halogen-substituted alcohols or halogen-substituted arylhydroxides, the presence of an excess of sodium should be avoided to minimize reaction of the halogen. For example, a good way to make sodium polyfluoroalkoxide is to add sodium dispersion in an inert hydrocarbon (e.g. toluene, cyclohexane) slowly to an ether solution of the appropriate polyfluoroalcohol at moderate temperatures in the range of 20°–35° C.

The reaction of the alkali metal alkoxide and/or aryloxide with the polyphosphonitrilic halide should be at a temperature high enough to achieve a reasonable reaction rate but not so high as to cause decomposition of the reactants or products. A good range in which to operate is from about 20° C. up to the reflux temperature of the solvents involved or higher if conducted in a sealed system, for example up to 200° C. The alkali metal alkoxide and/or aryloxide solution can be slowly added to the polyphosphonitrilic halide solution or the reverse addition may be used. After all reactants are introduced, the mixture is stirred at elevated temperature (e.g. 50° C. - reflux) until the reaction is substantially complete. This generally requires from about 4 hours up to about 36 hours.

At this point, the mixture comprises a solution of the desired organo-substituted polyphosphazene containing a substantial amount of alkali metal halide (e.g. NaCl) and usually some excess unreacted alkali metal alkoxide and/or aryloxide. Acid (e.g. hydrochloric acid, sulfuric acid, phosphoric acid and the like) is added in an amount at least sufficient to neutralize the residual alkoxide and/or aryloxide and preferably in an amount to render the mixture acidic.

In the past the salt has been removed at this point by water washing the polyphosphazene solution. However this can be a very troublesome operation because emulsions are usually encountered which are slow to separate.

When the solvent is a hydrocarbon such as toluene or cyclohexane the emulsions sometimes fail to separate at all. If salt is left in the product, the physical properties of the cured polymeric compositions made from the polyphosphazene gum are adversely affected.

According to the present invention the salt is removed from the solution by adding both water and a lower water-soluble alcohol to the substituted polyphosphazene solution. Water-soluble alcohols include methanol, ethanol, n-propanol, isopropanol, isobutanol and the like. The more preferred alcohols are methanol and isopropanol. Isopropanol is most preferred.

The amount of alcohol can vary widely. The amount should be at least sufficient to promote the separation of an aqueous phase. A useful range is about 10–200 parts by weight for each 100 parts of water. A more preferred amount is about 50–150 parts per 100 parts water. Excellent results have been achieved using equal weights of alcohol and water.

The amount of water should be an amount adequate to extract a substantial portion of the salt. A useful range is about 5–200 parts water per 100 parts polyphosphazene solution. A more preferred range is about 10–50 parts water per 100 parts polyphosphazene solution.

The water and alcohol may be added separately in any sequence or may be pre-mixed and the aqueous alcohol solution added. After addition of the water and alcohol the entire mass is vigorously stirred to extract the salt into the aqueous phase. This is usually done in about 5-45 minutes. Then stirring is stopped and the quiescent mixture is permitted to phase separate. Separation is usually complete in about 15 minutes but in stubborn cases can take up to about 4 hours or more which is still considered satisfactory and a great improvement over the results that would be obtained without the added alcohol.

The following examples serve to illustrate the best mode for carrying out the process:

EXAMPLES 1 AND 2

Phosphonitrilic Chloride Prep

High molecular weight substantially linear non-cross-linked polyphosponitrilic chloride ("PC") is made by mixing purified cyclic $PNCl_2$ trimer with about 0.17-0.28 weight percent boron trichloride-triphenylphosphate complex (cf. U.S. Pat. No. 4,226,840) and heating this under an inert nitrogen atmosphere at 220° C. for 48 hours. Some practice will be required in this step because the polymerization must be stopped prior to extensive cross-linking or a useless inorganic rubber will form. This inorganic rubber is insoluble in any organic solvent.

The PC is worked up by dissolving it in cyclohexane to form about a 35 weight percent solution and then precipitating the polymer by adding heptane to give a heptane:cyclohexane ratio of 3:1. Unreacted trimer and higher cyclics remain in solution and are removed by decantation. The precipitated PC polymer is then dissolved in cyclohexane or toluene to form a 10-20 weight percent solution suitable for use in the substitution reaction.

Phenoxide Prep

In a reaction vessel is placed sodium metal and the same solvent used in the PC prep (i.e. cyclohexane or toluene). This is heated at about 100°-110° C. to melt the sodium and then a 55:45 mole ratio solution of phenol/p-ethylphenol in the same solvent is slowly added with stirring and then cooked for at least 7 hours to complete phenoxide formation.

Substitution Reaction

Additional solvent of the same type is then added to the phenoxide slurry and then the PC solution is added to the phenoxide slurry and the mixture stirred at 150° C. for at least 8 hours to form a "substitution product" (SP).

Gum Recovery

The SP solution is neutralized with conc. sulfuric acid. Then water and isopropanol are added and the mixture stirred for 10-12 minutes to extract salt. The stirring is stopped and the phases are allowed to separate. The aqueous phase is removed and the substitution product (SP) is recovered from the organic phase by adding methanol sufficient to precipitate the SP gum.

Two different runs were carried out following the above general procedure—one in cyclohexane solvent and one in toluene solvent. The following table gives the details:

| | EXAMPLE | |
|---|---|---|
| | 1 | 2 |
| Phenoxide Prep | | |
| Solvent | cyclohexane | toluene |
| Solvent amount (Kg) | 5.69 | 7.66 |
| Sodium (g) | 193 | 195 |
| Phenol/p-ethylphenol 34 wt % solution (Kg) | 2.659 | 2.738 |
| Rx conditions | 12 hours 100-110° C. | 7 hours 100-110° C. |
| Substitution Reaction | | |
| Solvent | cyclohexane | toluene |
| Solvent amount (Kg) | 3.36 | 2.1 |
| PC solvent | cyclohexane | toluene |
| PC concentration (wt %) | 17.1 | 11.9 |
| Amount of PC solution (Kg) | 2.76 | 4.00 |
| Rx conditions | 8 hours 150° C. | 12 hours 150° C. |
| Gum Recovery | | |
| Amount of SP solution (g) | 3000 | 521 |
| Conc $H_2SO_4$ (g) | 7.25 | 0.8 |
| Isopropanol (g) | 600 | 104 |
| Water (g) | 600 | 104 |
| Mixing time | 10-12 min. | 10-12 min. |
| Separation Time | 3 min. | 2 hours |

EXAMPLES 3 AND 4

The PC was made in the same manner as in Examples 1 and 2. The PC is dissolved in cyclohexane to form a 10.9 weight percent solution.

Phenoxide Prep

Chucks of sodium metal are placed in a pressure vessel containing dry tetrahydrofuran (THF). The vessel is flushed with nitrogen, sealed and heated to 100°-110° C. to melt the sodium. THF solutions of 50 weight percent phenol and of 50 weight percent p-ethylphenol are fed to the pressure vessel. The mixture is cooked at 100°-110° C. for 7 hours to form a THF solution of sodium phenoxide and sodium p-ethylphenoxide.

In a separate pressure vessel is placed THF and sodium metal. This is heated to 100°-110° C. to melt the sodium. Orthoallylphenol is added and the mixture stirred at 100°-110° C. for 7 hours to form a THF solution of sodium o-allylphenoxide.

Substitution Reaction

THF is placed in a reaction vessel in an amount to give a THF:cyclohexane (from the PC solution) ratio of 1.5:1. PC solution is then charged to the reaction vessel followed by o-allylphenoxide solution to give the desired o-allylphenoxide level. This mixture is stirred at room temperature for 30 minutes. Then the phenoxide/p-ethylphenoxide solution is charged in an amount to give a 3 percent stoichiometric excess of total phenoxides. The mixture is then stirred 8 hours at 150° C. to give the substitution product ("SP").

SP Gum Recovery

The gum solution is neutralized by adding conc. $H_2SO_4$ in approximately 10 percent excess. The acidified solution is then washed with water equal to 20 percent of the SP gum present and isopropanol to cause phase separation. This mixture is stirred 30 minutes and then left to separate. The aqueous phase is removed and the SP gum is precipitated from the organic phase by adding methanol.

Two different runs were carried out following the above general procedure. The following table gives the details:

|  | EXAMPLE | |
| --- | --- | --- |
|  | 3 | 4 |
| Ortho-allylphenoxide Prep |  |  |
| THF (g) | 4012 | 4012 |
| Sodium (g) | 550 | 550 |
| Ortho-allylphenol (g) | 3300 | 3300 |
| Rx conditions | 7 hours | 7 hours |
|  | 100–110° C. | 100–110° C. |
| Phenoxide/p-ethylphenoxide Prep |  |  |
| THF (g) | 2000 | 2000 |
| Sodium (g) | 525 | 525 |
| 50% phenol/THF solution (g) | 2431 | 2431 |
| 50% p-ethylphenol/THF solution (g) | 2581 | 2581 |
| Rx conditions | 7 hours | 7 hours |
|  | 100–110° C. | 100–110° C. |
| Substitution Reaction |  |  |
| THF (Kg) | 4.94 | 4.94 |
| CP Solution (Kg) | 4.81 | 4.81 |
| O—allylphenoxide solution (g) | 287 | 287 |
| Phenoxide/p-ethylphenoxide solution (Kg) | 2.476 | 2.504 |
| Rx conditions | 14 hours | 12 hours |
|  | 150° C. | 145° C. |
| Gum Recovery |  |  |
| SP solution (Kg) | 10.720 | 10.010 |
| Conc. H$_2$SO$_4$ (g) | 5.47 | 6.35 |
| Water (g) | 2144 | 2002 |
| Isopropanol (g) | 1072 | 1001 |
| Isopropanol (g) | — | 500 |
| Separation Time | 22.5 hrs. | (2) |

(1) 50 wt % cyclohexane solution
(2) Poor separation overnight with first isopropanol change. Good separation over week-end after second isopropanol charge.

The SP gum made by this process is low in residual sodium. It is useful for making articles such as o-rings, wire and cable insulation, fire and smoke resistant thermal insulation and the like. For example, it can be compounded with inorganic fillers, zinc stearate, plasticizers and other processing aids, sulfur, vulcanization accelerators and chemical blowing agents in standard rubber compounding equipment. The compounded material can then be shaped into slabs and heated to foam the slab and vulcanize the foamed slab which is an excellent fire resistant thermal insulating material having very low smoke emission properties when exposed to fire.

I claim:

1. A process for making a low-salt polyphosphazene said process comprising
   (A) reacting a solution of a polyphosphonitrilic halide with a substituting agent selected from alkali metal alkoxides, alkali metal aryloxides or both alkali metal alkoxides and aryloxides to form a solution of alkoxy-substituted, aryloxy-substituted or both alkoxy and aryloxy-substituted polyphosphazene containing alkali metal halide contaminant,
   (B) neutralizing residual alkali metal alkoxide and/or aryloxide,
   (C) adding water and a lower water-soluble alcohol to the substituted polyphosphazene solution to dissolve said alkali metal halide,
   (D) separating an aqueous phase containing said alkali metal halide and a non-aqueous organic phase containing said low-salt polyphosphazene, and
   (E) recovering said low-salt polyphosphazene from said organic phase.

2. A process of claim 1 wherein said polyphosphonitrilic halide is a substantially linear non-cross-linked polyphosphonitrilic halide containing about 10–50,000 (PNX$_2$) units wherein X is halogen.

3. A process of claim 2 wherein said polyphosphonitrilic halide is a polyphosphonitrilic chloride.

4. A process of claim 3 wherein said polyphosphonitrilic chloride is dissolved in a solvent selected from aromatic hydrocarbons, cycloaliphatic hydrocarbons and ethers.

5. A process of claim 4 wherein said substituting agent is a sodium aryloxide or mixture of sodium aryloxides.

6. A process of claim 5 wherein said sodium aryloxide comprises a mixture of sodium phenoxide and sodium alkylphenoxide.

7. A process of claim 6 wherein said sodium alkylphenoxide is mainly sodium p-ethylphenoxide.

8. A process of claim 5 wherein said substituting agent includes up to 50 mole percent of a compound having olefinic unsaturation sufficient to impart vulcanization properties to the substituted product.

9. A process of claim 8 wherein said compound is sodium o-allylphenoxide.

10. A process of claim 9 wherein said substituting agent comprises 20–80 mole percent sodium phenoxide, 20–80 mole percent sodium p-alkylphenoxide and 1–15 mole percent sodium o-allylphenoxide.

11. A process of claim 5 wherein said solvent is toluene.

12. A process of claim 5 wherein said solvent is a mixture of toluene and cyclohexane.

13. A process of claim 5 wherein said solvent is cyclohexane.

14. A process of claim 1 wherein said solution of polyphosphonitrilic halide is a solution in a hydrocarbon solvent selected from aromatic hydrocarbons and cycloaliphatic hydrocarbons and mixtures thereof.

15. A process of claim 14 wherein said solvent is selected from toluene, cyclohexane and mixtures thereof.

16. A process of claim 1 wherein said alkali metal alkoxides, aryloxides or both alkoxides and aryloxides are at least partially dissolved in an ether solvent.

17. A process of claim 16 wherein said ether is selected from tetrahydrofuran, di-C$_{1-2}$ alkoxy ethane, di-C$_{1-2}$ alkyl ethers of dialkylene glycol or mixtures thereof.

18. A process of claim 5 wherein said neutralizing in step (B) is conducted by adding sulfuric acid.

19. A process of claim 5 wherein said lower water-soluble alcohol is methanol.

20. A process of claim 5 wherein said lower water-soluble alcohol is isopropanol.

21. A process of claim 20 wherein said substituting agent comprises a mixture of sodium phenoxides and sodium p-alkylphenoxides.

22. A process of claim 21 wherein said substituting agent includes up to 50 mole percent of a compound having olefinic unsaturation sufficient to impart vulcanization properties to the substituted product.

23. A process of claim 22 wherein said compound having olefinic unsaturation is sodium o-allylphenoxide.

24. A process of claim 23 wherein said substituting agent comprises 20–80 mole percent of sodium phenoxide, 20–80 mole percent sodium p-ethylphenoxide and 1–15 mole percent sodium o-allylphenoxide.

25. A process of claim 5 wherein said polyphosphonitrilic halide is dissolved in a hydrocarbon solvent selected from aromatic hydrocarbons, cycloaliphatic hydrocarbons and mixtures thereof.

26. A process of claim 25 wherein said substituting agent is at least partially dissolved in an ether.

27. A process of claim 26 wherein said ether is selected from tetrahydrofuran, di-$C_{1-2}$ alkoxy ethane, di-$C_{1-2}$ alkyl ethers of dialkylene glycol and mixtures thereof.

28. A process of claim 25 wherein said hydrocarbon solvent is selected from toluene, cyclohexane and mixtures thereof.

* * * * *

UNITED STATES PATENT AND TRADEMARK OFFICE
CERTIFICATE OF CORRECTION

PATENT NO. : 4,576,806
DATED      : MARCH 18, 1986
INVENTOR(S) : MATTHEW K. JUNEAU

It is certified that error appears in the above-identified patent and that said Letters Patent is hereby corrected as shown below:

Column 7, line 21, reads "CP Solution (Kg)" and should read -- PC Solution[1] (Kg) --.

[SEAL]

Signed and Sealed this

Nineteenth Day of August 1986

Attest:

DONALD J. QUIGG

Attesting Officer

Commissioner of Patents and Trademarks